(12) United States Patent
Maeda (10) Patent No.: US 10,099,442 B2
(45) Date of Patent: Oct. 16, 2018

(54) TIRE MOLD AND TIRE CURING APPARATUS

(71) Applicant: BRIDGESTONE CORPORATION, Tokyo (JP)

(72) Inventor: Toshiyuki Maeda, Tokyo (JP)

(73) Assignee: BRIDGESTONE CORPORATION, Tokyo (JP)

( * ) Notice: Subject to any disclaimer, the term of this patent is extended or adjusted under 35 U.S.C. 154(b) by 108 days.

(21) Appl. No.: 15/304,895

(22) PCT Filed: May 26, 2015

(86) PCT No.: PCT/JP2015/065018
§ 371 (c)(1),
(2) Date: Oct. 18, 2016

(87) PCT Pub. No.: WO2015/182578
PCT Pub. Date: Dec. 3, 2015

(65) Prior Publication Data
US 2017/0144393 A1    May 25, 2017

(30) Foreign Application Priority Data
May 27, 2014  (JP) .................................. 2014-109538

(51) Int. Cl.
*B29D 30/06* (2006.01)
*B29C 33/10* (2006.01)
(Continued)

(52) U.S. Cl.
CPC .......... *B29D 30/0606* (2013.01); *B29C 33/10* (2013.01); *B29C 35/02* (2013.01);
(Continued)

(58) Field of Classification Search
CPC ............ B29D 30/0606; B29D 30/0629; B29D 2030/0617
See application file for complete search history.

(56) References Cited

U.S. PATENT DOCUMENTS 3,337,918 A * 8/1967 Pacciarini et al. ........................... B29D 30/0605
264/315
3,922,122 A * 11/1975 Bottasso ............ B29D 30/0605
425/46

(Continued)

FOREIGN PATENT DOCUMENTS

CN      103492146 A    1/2014
DE   102010037785 A1    3/2012
(Continued)

OTHER PUBLICATIONS

Feb. 27, 2017 Search Report issued in European Patent Application No. 15799711.5.
(Continued)

*Primary Examiner* — James P Mackey
(74) *Attorney, Agent, or Firm* — Oliff PLC (57) ABSTRACT

A tire mold featuring a reusable base mold even when a pattern mold having been fitted to the base mold is to be replaced with another pattern mold. To that end, the tire mold includes a base mold and a pattern mold detachably fitted to the base mold. A tread pattern is formed on a crown region of a tire by a pattern molding surface of the pattern mold which faces the crown region. The base mold has an inner fitting periphery to be fitted to an outer fitting periphery of the pattern mold on the opposite side of the pattern molding surface thereof, and a peripheral length of the inner fitting periphery of the base mold is set shorter than a peripheral length of the outer fitting periphery of the pattern mold.

6 Claims, 4 Drawing Sheets

(51) Int. Cl.
  *B29C 35/02*   (2006.01)
  *B29K 21/00*   (2006.01)
  *B29L 30/00*   (2006.01)

(52) U.S. Cl.
  CPC .. *B29D 30/0629* (2013.01); *B29D 2030/0617* (2013.01); *B29K 2021/00* (2013.01); *B29L 2030/002* (2013.01)

(56) References Cited

U.S. PATENT DOCUMENTS

| | | | | |
|---|---|---|---|---|
| 5,120,209 | A * | 6/1992 | MacMillan | B29D 30/0606 264/326 |
| 5,234,326 | A * | 8/1993 | Galli | B29C 33/10 425/46 |
| 5,290,163 | A * | 3/1994 | Katsumata | B29D 30/0629 425/183 |
| 5,639,326 | A * | 6/1997 | Soulalioux | B29D 30/0629 156/110.1 |
| 6,382,943 | B1 * | 5/2002 | Metz | B29D 30/0606 29/428 |
| 7,384,252 | B2 * | 6/2008 | Iwamoto | B22F 5/007 419/2 |
| 7,524,175 | B2 * | 4/2009 | Henrotte | B29C 33/10 425/28.1 |
| 7,670,124 | B2 | 3/2010 | Hyodo | |
| 2006/0008547 | A1 | 1/2006 | Ohara | |
| 2007/0248707 | A1 | 10/2007 | Ohara | |
| 2007/0284783 | A1 | 12/2007 | Ohara | |
| 2014/0370137 | A1 | 12/2014 | Takada | |

FOREIGN PATENT DOCUMENTS

| | | |
|---|---|---|
| DE | 11 2012 001298 T5 | 1/2014 |
| JP | 2002-361632 A | 12/2002 |
| JP | 2007-062270 A | 3/2007 |
| JP | 2007-331163 A | 12/2007 |
| JP | 2009-269362 A | 11/2009 |
| JP | 4382673 B2 | 12/2009 |
| WO | 2009/064068 A1 | 5/2009 |

OTHER PUBLICATIONS

Aug. 11, 2015 International Search Report issued in International Patent Application No. PCT/JP2015/065018.

Nov. 29, 2016 International Preliminary Report on Patentability issued in International Patent Application No. PCT/JP2015/065018.

Feb. 8, 2018 Search Report issued in Chinese Patent Application No. 2015800272278.

Dalian Rubber and Plastic Machinery Institute, "Rubber and Plastic Machinery." Basic Situation of Foreign Machinery Industry, pp. 1-3.

\* cited by examiner

TIRE MOLD AND TIRE CURING APPARATUS

TECHNICAL FIELD

The present invention relates to a mold for curing a tire and a tire curing apparatus.

BACKGROUND ART

Description of the Related Art

Known as a mold for curing an uncured tire (hereinafter referred to simply as "tire") is a mold combining a base mold serving as a base member and a pattern mold formed thinner than the base mold and serving as a surface member. Disclosed in Patent Document 1 is a mold having the fitting surfaces of the base mold and the pattern mold of substantially the same peripheral length thereof.

A plurality of the above-mentioned molds are so arranged as to circumferentially surround the crown region of a tire within a curing apparatus. And an annularly enclosed space surrounding the crown region of the tire is formed with the circumferential end faces of the base molds and the circumferential end faces of the pattern molds of the circumferentially adjacent molds joined closely to each other. Also, the pattern mold has recesses and projections formed thereon corresponding to the tread pattern and design to be formed on the crown region of the tire to be cured. And, using such a mold, a tire with different tread pattern can be cured by simply replacing the pattern mold fitted to the base mold with another pattern mold having different recesses and projections thereon.

However, the pattern mold has not only the recesses and projections but also tiny air vent holes for discharging air that is trapped between the periphery of the pattern mold and the tire surface during the curing process. And the air vent holes are located with consideration given to the shapes and positions of the recesses and projections. Also, the air vent holes are communicated with the discharge passages provided within the base mold. And the air led out of the air vent holes is discharged out of the mold after passing through the discharge holes and passages formed inside the base mold.

That is, with the above-described mold, the same base mold cannot be used when there is any change in the positions of the air vent holes as a result of pattern mold replacement. It is therefore necessary to prepare in advance another base mold having discharge holes corresponding in positions to the air vent holes in the new pattern mold. This leads to longer period of mold manufacture and higher cost.

RELATED ART DOCUMENT

Patent Document

Patent Document 1: Japanese Patent No. 4382673

SUMMARY OF THE INVENTION

Problem to be Solved by the Invention

The present invention has been made in view of the foregoing problems, and an object of the invention is to provide a reusable tire mold without changing the base mold when a pattern mold fitted to the base mold is to be replaced with a different pattern mold and a tire curing apparatus incorporating such a tire mold.

Means for Solving the Problem

To solve the above-mentioned problem, a tire mold includes a base mold and a pattern mold detachably fitted to the base mold. The pattern mold has a pattern molding surface opposite to a crown region of a tire and forms a tread pattern on the crown region. The base mold has an inner fitting periphery to be fitted to an outer fitting periphery of the pattern mold on an opposite side of the pattern molding surface thereof. And a peripheral length of the inner fitting periphery is set shorter than a peripheral length of the outer fitting periphery.

According to this arrangement, the base mold has an inner fitting periphery which is to be fitted to an outer fitting periphery of the pattern mold on the opposite side of the pattern molding surface thereof. And the peripheral length of the inner fitting periphery is shorter than the peripheral length of the outer fitting periphery. Therefore, with the pattern molds of a plurality of tire molds placed side by side in the circumferential direction, air gaps can be formed between the circumferentially adjacent base molds located radially outside of the pattern molds. Thus the air led out from the pattern mold side can be discharged through the air gaps. And as a result, the base molds can be reused even when the pattern molds are to be replaced by different pattern molds.

It should be noted that the foregoing summary of the invention does not necessarily recite all the features essential to the invention. It is therefore to be understood that the individual structures constituting these groups of features also fall within the scope of the invention.

BEST MODE FOR CARRYING OUT THE INVENTION

The invention will now be described in detail based on preferred embodiments which do not intend to limit the scope of the claims of the present invention but exemplify the invention. All of the features and the combinations thereof described in the embodiments are not necessarily essential to the invention.

Figure 1:
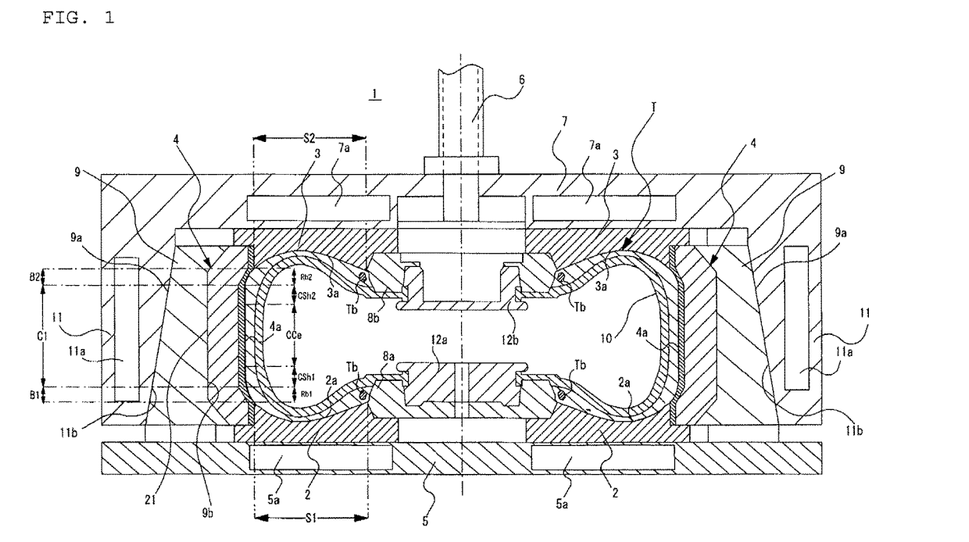
FIG. 1 is a schematic cross section showing a curing apparatus.

FIG. 1 is a schematic cross section of a curing apparatus 1. As shown in the figure, the curing apparatus 1 has a side mold 2 for molding and curing one side region S1 of an uncured tire (hereinafter referred to simply as "tire") T placed horizontally with the central axis of rotation extending vertically and a side mold 3 for molding and curing the other side region S2 of the tire T. The curing apparatus 1 also has a plurality of sector molds 4 for molding and curing mainly the crown region C1, placed along the crown region C1 of the tire T between the side molds 2 and 3.

The tire T is, for instance, an uncured tire molded on a not-shown tire molding drum. The tire T, as it is placed within the curing apparatus 1, is constructed of such not-shown component members as a carcass extending toroidally astride a pair of bead regions Tb, Tb disposed vertically apart from each other, a plurality of belts stacked on the carcass and a tread rubber in the crown region C1, and side rubbers disposed on the carcass in the side regions S1, S2.

The side mold 2 is a disk-shaped mold with an open central section. The side mold 2 molds the surface of the side region S1 with the molding surface 2a in contact with the side region S1 extending from the vicinity of one of the bead regions Tb, Tb toward the crown region C1 with the tire T placed in position. Also, the side mold 2 is placed on a base 5 which has a heating chamber 5a therein. The heating chamber 5a is an annular flow channel formed in the base 5 in such a manner as to be opposite to the outer periphery of the side mold 2. A heating medium is supplied into the heating chamber 5a from a not-shown heat source supply unit. The heat produced by the heating medium is transferred to the side region S1 via the side mold 2. The open section of the side mold 2 is closed by a bead ring 8a, which molds the periphery of one of the bead regions Tb, Tb, and a clamp ring 12a, which holds the bladder 10 to be discussed later.

The side mold 3, as with the side mold 2, is a disk-shaped mold with an open central section. The side mold 2 molds the surface of the side region S2 with the molding surface 3a in contact with the side region S2 extending from the vicinity of the other of the bead regions Tb, Tb toward the crown region C1 with the tire T placed in position. The side mold 3 is placed below the lower face of an outer ring 7 which rises and lowers along with the up-and-down movement of a center post 6. Provided inside the outer ring 7 is a heating chamber 7a. The heating chamber 7a is an annular flow channel formed inside the outer ring 7 in such a manner as to be opposite to the outer periphery of the side mold 3. A heating medium is supplied into the heating chamber 7a from a not-shown heat source supply unit, as with the heating chamber 5a. The heat produced by the heating medium is transferred to the side region S2 via the side mold 3. The open section of the side mold 3 is closed by a bead ring 8b, which molds the periphery of the other of the bead regions Tb, Tb, and a clamp ring 12b, which holds the bladder 10 to be discussed later.

Figure 4:
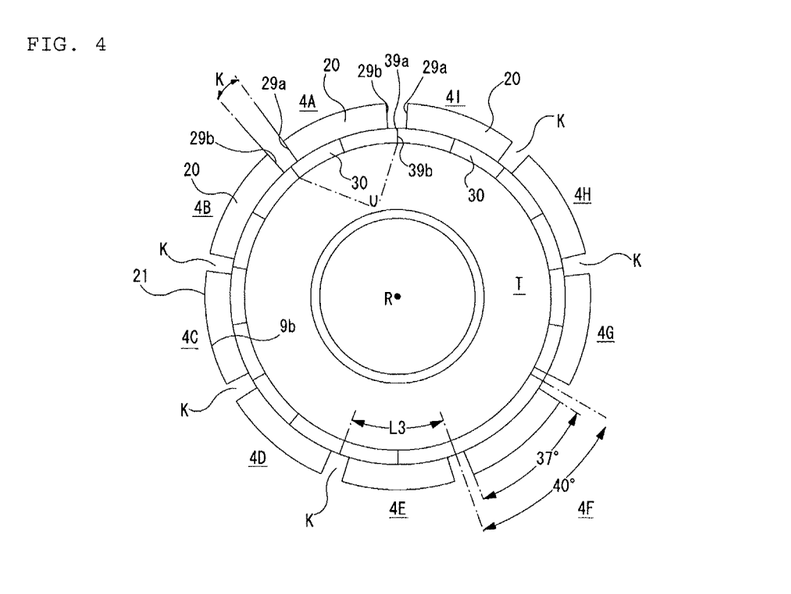
FIG. 4 is a plan view for explaining the arrangement of sector molds.

The plurality of sector molds 4, as they are combined with each other circumferentially, enclose the crown region C1, which is the main ground contact surface of the tire T, and the buttress portions B1 and B2 located on the respective axial sides of the crown region C1. Although the detail will be discussed later, the sector mold 4 comprises a base mold 20 serving as the base member and a pattern mold 30 as the surface part detachably fitted to the base mold 20. As shown in FIG. 4, with the plurality of sector molds 4 fitted together, the circumferential end faces 39a and 39b of pattern molds 30 constituting a part of the sector molds 4 are brought into close contact with the circumferential end faces 39b and 39a of the pattern molds 30 of the adjoining sector molds 4. On the other hand, the circumferential end faces 29a and 29b of the base molds 20 disposed radially outside of the pattern molds 30 remain spaced apart from the circumferential end faces 29b and 29a of the base molds 20 of the adjoining sector molds 4.

Figure 2:
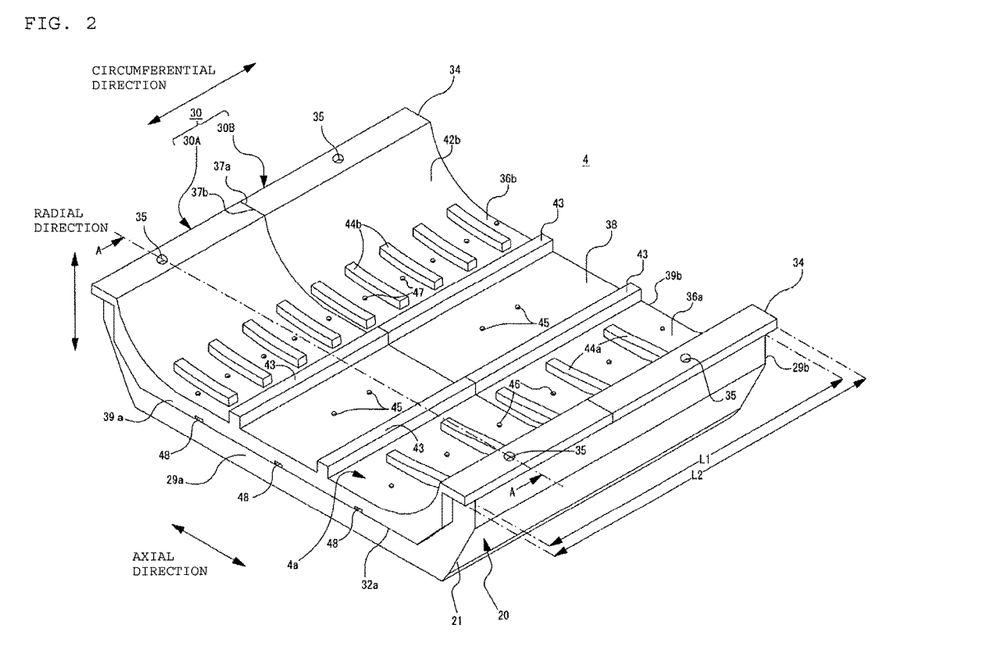
FIG. 2 is an overall perspective view of a sector mold.

For example, 9 units of sector molds 4 are arranged at uniform angles along the circumference of the tire T. As shown in FIG. 2, the pattern molding surface 4a of the pattern mold 30 that comes in contact with the crown region C1 and the buttress portions B1 and B2 has recesses and projections for molding a predetermined tread pattern on the surface of the crown region C1 and air vent holes formed therein. As the pattern molding surface 4a comes in contact with the surface of the crown region C1, a tread pattern having inverted recesses and projections formed by the pattern molding surface 4a is molded on the crown region C1. Note that a detailed description of the pattern molding surface 4a will be given later.

As shown in FIG. 1, the plurality of sector molds 4 are held by a plurality of segments 9 which are so installed as to be movable radially wider or narrower along a slider mechanism disposed on the base 5. The outer periphery 9a of the segments 9 is formed as an inclined surface of the same gradient as that of the inner periphery 11b of the arm portion 11 of the outer ring 7. At the start of the curing process, the center post 6 is lowered to have the inner periphery 11b of the arm portion 11 slide along the outer periphery 9a of the segments 9, thus radially moving the segments 9 narrower. As shown in FIG. 1 and FIG. 4, the inner periphery 9b of the segment 9 is so shaped as to be fitted to the outer periphery 21 of the base mold 20 constituting apart of the sector mold 4. Also, the peripheral lengths of the inner periphery 9b and the outer periphery 21 may be set to substantially the same length or different lengths from each other.

As the center post 6 reaches the lowering limit position, the plurality of sector molds 4 enclose the crown region C1 of the tire T circumferentially. As shown in FIG. 1, an annular heating chamber 11a is provided inside the arm portion 11 of the outer ring 7 so disposed as to be opposite to the outer periphery 9a of the segments 9. As with the other heating chambers 5a and 7a, a heating medium is supplied to the heating chamber 11a from a not-shown heat source supply unit. The heat produced by the heating medium is transferred to the crown region C1 via the segments 9 and the sector molds 4. When stripping the tire T from the mold on completion of the curing process, the center post 6 is raised to free the hold on the segments 9 by the arm portion 11 of the outer ring 7 and cause the segments 9 to spread wider radially.

A bladder 10 is placed on the inner periphery of the tire T enclosed by the side molds 2 and 3 and the plurality of sector molds 4. The bladder 10 is of an elastic material inflatable by a fluid supplied from outside of the curing apparatus 1. As the bladder 10 is inflated, the outer periphery of the bladder 10 comes into tight contact with the inner periphery of the tire T and pushes the entire outer periphery of the tire T against the side molds 2 and 3 and the plurality of sector molds 4.

As described above, the tire T inside the curing apparatus 1 is held in a state of being pressed by the side molds 2 and 3, the plurality of sector molds 4, and the bladder 10. Further, the tire T is heated by the heating medium supplied into the plurality of heating chambers 5a, 7a, and 11a as the curing progresses gradually.

Also, the tire curing apparatus 1 has a plurality of tire molds arranged along the crown region of a tire. The tire molds each include a base mold and a pattern mold detachably fitted to the base mold and having a pattern molding surface opposite to the crown region of a tire to form a tread pattern on the crown region. The base mold has an inner fitting periphery to be fitted to the outer fitting periphery of the pattern mold on the opposite side of the pattern molding surface thereof. And the peripheral length of the inner fitting periphery is set shorter than the peripheral length of the outer fitting periphery. Also, the circumferentially adjacent end faces of the pattern molds of the circumferentially adjacent tire molds of the plurality of tire molds come in contact with each other such that the circumferentially adjacent end faces of the base molds do not come in contact with each other.

In this arrangement, therefore, the circumferentially adjacent end faces of the base molds of the circumferentially adjacent molds do not come in contact with each other, or are spaced apart from each other. Hence, there result air gaps between the circumferentially adjacent end faces of the base molds, through which the air led out from the pattern mold side can be discharged outside. And as a result, the base molds can be reused even when the pattern molds are to be replaced by different pattern molds. Also, the position where the circumferential end faces of the pattern molds of the circumferentially neighboring molds come in contact with each other is located between the base molds of the circumferentially neighboring molds to discharge air more efficiently.

Also, as another arrangement of the tire curing apparatus 1, the pattern mold is constituted by a plurality of division pieces divided in the circumferential and axial directions or in one of these directions. And the division pieces are fitted together by way of a plurality of fastening portions formed on the inner fitting periphery of the base molds. The plurality of fastening portions include those which may not be used when the division pieces are fitted to the base molds.

According to this arrangement, as mentioned above, the plurality of fastening portions include those which may not be used when the division pieces are fitted to the base molds. Therefore, even when the total number of the division pieces is increased on account of reduction in division angle of each division piece, the increased number of division pieces can be fitted properly to the base molds. Accordingly, even when there is a change in the division angle of the division pieces constituting the pattern mold, the base molds can be reused without changing them.

Also, as another arrangement of the tire curing apparatus 1, the base mold is constituted by a plurality of division pieces divided in the circumferential and axial directions or in one of these directions. And the division pieces are not in contact with each other.

According to this arrangement, the division pieces are not in contact with each other, or are spaced apart from each other. As a result, air gaps are formed between them, through which the air led out from the pattern mold side can be discharged outside. Also, the position where the plurality of division pieces constituting the pattern mold come in contact with each other is located between the plurality of division pieces constituting the base molds to discharge air more efficiently.

As still another arrangement of the tire curing apparatus 1, the pattern mold may have air discharge channels formed on the outer fitting periphery thereof and extending to the circumferential or axial end face sides thereof.

According to this arrangement, the air led out from the pattern mold side can be led to the air gaps, through which it can be discharged more readily.

Hereinbelow, a detailed description is given of structures of sector molds 4 according to preferred embodiments with reference to FIGS. 2 to 4. For convenience of explanation, each sector mold 4 is divided into the center region CCe corresponding to the crown region C1 of the tire T, the shoulder regions Csh1 and CSh2, and the buttress regions Rb1 and Rb2 corresponding to the buttress regions of the tire T. However, it should be noted that these regions can vary with the profile shapes of the crown region C1 and the buttress regions B1 and B2 of the tire T to be cured. In the present embodiment, it is to be understood that the center region CCe of the sector mold 4 is the region at least astride the axial center (tire center TC) of the crown region C1 of the tire T. And the shoulder regions Csh1 and CSh2 are the regions corresponding to the remaining parts of the crown region C1 of the tire T with the exclusion of the center region CCe.

FIG. 2 is a schematic perspective view showing a sector mold 4 out of a plurality of sector molds 4. FIG. 3 is an axial cross section (A-A section) of the sector mold 4. It is to be noted that the axial direction, the circumferential direction, and the radial direction as used in the following explanation refer to the directions with reference to the tire T as placed in the curing apparatus 1 of FIG. 1.

As shown in FIG. 2, the sector mold 4 includes a base mold 20 as a base member and a thin-walled pattern mold 30 as a surface part to be detachably fitted to the base mold 20. The base mold 20 and the pattern mold 30 are made of a metallic material, such as aluminum, iron, or stainless steel, for instance. Also, the base mold 20 is fabricated, for example, through a casting process or a machining process. The pattern mold 30 is fabricated through a general casting process or machining process or by an additive manufacturing process based on a basic model of 3D CAD data or the like. Hereinbelow, a description is given of specific shapes of the base mold 20 and the pattern mold 30.

Figure 3:
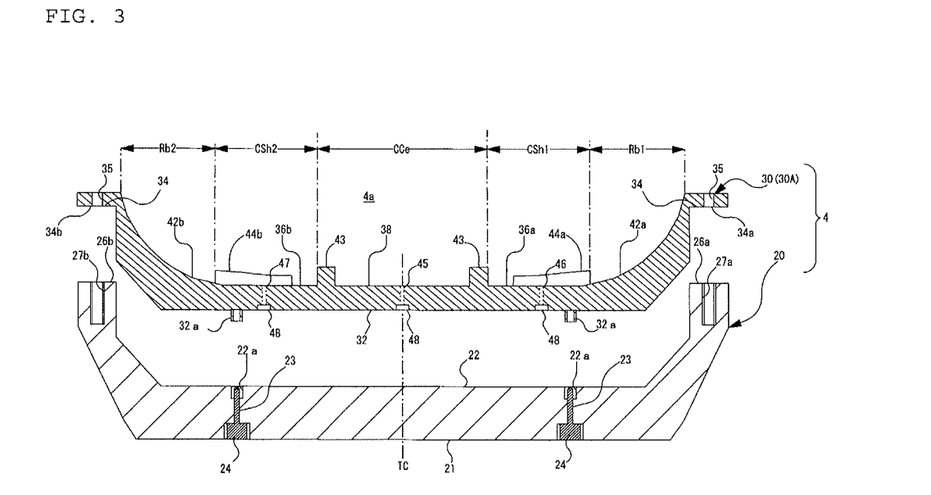
FIG. 3 illustrates an axial cross section (A-A section of FIG. 2) of a sector mold.

As shown in FIG. 2 and FIG. 3, the base mold 20 has an outer periphery 21 in a shape mutually complementary to and in close contact with the inner periphery 9b of the segment 9. It is to be noted that the segment 9 and the base mold 20 detachably fitted together by a not-shown fixing means. Formed on the side of the base mold 20 opposite from the outer periphery 21 is an inner periphery (inner fitting periphery) 22 which is to be fitted to the outer periphery (outer fitting periphery) 32 of the pattern mold 30. The inner periphery 22 has a shape mutually complementary and fittable to the outer periphery 32 of the pattern mold 30. As shown in FIG. 2 and FIG. 4, the circumferential length (dimension in the circumferential direction) L1 of the inner periphery 22 of the base mold 20 is set shorter than the circumferential length (dimension in the circumferential direction) L2 of the outer periphery 32 of the pattern mold 30. Hence, when the pattern mold 30 is fitted to the base mold 20, the circumferential end faces 39a and 39b of the pattern mold 30 protrude in the circumferential direction from the circumferential end faces 29a and 29b of the base mold 20.

As shown in FIG. 3, the inner periphery 22 of the base mold 20 is provided with a plurality of positioning recesses 22a, 22a depressed radially outwardly. The positioning recesses 22a, 22a are formed at equal intervals on the respective axial sides. The positioning recesses 22a are each communicated with the outer periphery 21 via a bolt hole 23 extending from the bottom thereof to the outer periphery 21 side. The bolt hole 23 allows a bolt 24 as a fixing means to be screwed thereinto from the outer periphery 21 side toward the inner periphery 22 side. The threaded part formed at the end of the bolt 24 is screwed into each threaded part (internal thread) of a plurality of positioning projections 32a provided on the outer periphery 32 of the pattern mold 30. The positioning recesses 22a, 22a and the corresponding bolt holes are arranged, for instance, at 10-degree intervals circumferentially.

Formed on the respective axial sides of the inner periphery 22 are inner joining faces 26a and 26b mutually complementary in shape to the outer joining faces 34a and 34b of the joining flanges 34, 34 formed on the pattern mold 30. The inner joining faces 26a and 26b are provided with a plurality of bolt holes 27a and 27b, respectively. The plurality of bolt holes 27a and 27b are arranged, for instance, at 10-degree intervals circumferentially as with the above-mentioned positioning recesses 22a, 22a and the corresponding bolt holes 23.

As described above, the inner periphery 22 of the base mold 20 is formed with a plurality of fastening portions arranged axially and circumferentially, which are constituted by the positioning recesses 22a, 22a, the corresponding bolt holes 23, and the bolt holes 27a and 27b. And in this embodiment, a pattern mold 30 is comprised of two circumferentially adjacent division pieces 30A and 30B as will be discussed later. Therefore, the fastening portions required for the fastening of the division pieces 30A and 30B to the base mold 20 are only some of the plurality of the fastening portions, and the rest of the fastening portions remain unused. In this manner, a plurality of fastening portions are formed at predetermined intervals in the circumferential direction. This makes it possible to detachably fit the division pieces to the same base molds 20 even when the number of division pieces to be fitted to the base molds 20 is increased due to a reduction in the circumferential angle (division angle) of a division piece.

In this arrangement, therefore, the pattern mold 30 is comprised of a plurality of division pieces, which are divided in the circumferential and axial directions or in either one of the directions. The division pieces are fitted to the base mold by way of a plurality of fastening portions formed on the inner fitting surface of the base mold. And the plurality of the fastening portions, when the division pieces are fitted to the base molds, may include some of them which remain unused.

According to this arrangement, the plurality of the fastening portions, when the division pieces are fitted to the base molds, may include fastening portions which remain unused. This makes it possible to fit the division pieces properly to the base molds even when the total number of division pieces is increased due to a reduction in the division angle of each division piece. Accordingly, even when there is a change in the division angle of the division pieces constituting the pattern mold, the base molds can be reused without changing them.

Next, a description is given of a pattern mold 30 fitted to a base mold 20. In the present embodiment, the pattern mold 30 is fitted to the base mold 20 in such a manner that two division pieces 30A and 30B combined together circumferentially are fitted to a single base mold 20. The pattern mold 30 (division pieces 30A and 30B) has an outer periphery (outer fitting periphery) 32 to be fitted to the inner periphery 22 of the base mold 20. Provided on the outer periphery 32 are a plurality of positioning projections 32a, 32a in positions corresponding to a plurality of positioning recesses 22a, 22a provided on the inner periphery 22 of the base mold 20. A positioning projection 32a is cylindrical in shape having an outer diameter substantially the same as the inner diameter of the positioning recess 22a. Also, formed on the inner portion of the positioning projection 32a is a threaded part to engage with the end portion of the bolt 24. It is to be noted that the positions of the positioning projections 32a may be set arbitrarily according to the positions of the plurality of positioning recesses 22a, 22a provided on the inner periphery 22 of the base mold 20.

The base mold 20 and the pattern mold 30 are fitted together as follows. The pattern mold 30 is positioned with the positioning projections 32a provided on the outer peripheries 32 of the division pieces 30A and 30B constituting the pattern mold 30 into the plurality of positioning recesses 22a provided on the base mold 20. Then bolts 24 are inserted into the positioning projections 32a through the bolt holes 23 from the outer periphery 21 side of the base mold 20 and tightened. Further, not-shown bolts are inserted into the plurality of bolt holes 27a and 27b from the side of the plurality of bolt holes 35 (a total of four in the illustrated example) provided in the pattern mold 30 (division pieces 30A and 30B) and tightened. This will form a single pattern mold 30 with the circumferential end faces 37a and 37b of the circumferentially adjacent division pieces 30A and 30B brought into close contact with each other. At the same time, the pattern mold 30 is firmly combined with the base mold 20 as the outer periphery 32 of the pattern mold 30 is closely fitted to the inner periphery 22 of the base mold 20. It is to be noted that the positions of the plurality of bolt holes 35 may also be set arbitrarily according to the positions of the bolt holes 27a and 27b provided in the inner joining faces 26a and 26b of the base mold 20.

Formed continuously on the radially opposite side of the pattern mold 30 are the shoulder-area inner peripheries 36a and 36b, the center-area inner periphery 38, and the buttress-area inner peripheries 42a and 42b, which constitute the pattern molding surface 4a. As shown in FIG. 2, formed on the center-area inner periphery 38 are a plurality of main groove molding projections 43, 43. The main groove molding projections 43, 43 extend continuously in the circumferential direction at an equal distance from the tire center T in between. Also, formed on the shoulder-area inner peripheries 36a and 36b are a plurality of lateral groove molding projections 44a and 44b, respectively. The plurality of lateral groove molding projections 44a are disposed at equal intervals in the circumferential direction on the shoulder-area inner peripheries 36a and extend in an arc from the side of one of the main groove molding projections 43, 43 toward the buttress-area inner peripheries 42a. On the other hand, the plurality of lateral groove molding projections 44b are disposed at equal intervals, narrower than those on the lateral groove molding projections 44a side, in the circumferential direction on the shoulder-area inner peripheries 36b and extend in an arc from the side of the other of the main groove molding projections 43, 43 toward the buttress-area inner peripheries 42b. In this manner, provided on the shoulder-area inner peripheries 36a and 36b and the center-area inner periphery 38, which constitute the pattern molding surface 4a are the projections that mold a desired tread pattern on the crown region C1 of the tire T to be cured. Thus, with the tire T cured as it is pressed against the pattern molding surface 4a, the crown region C1 of the tire T will have a tread pattern having the grooves in the shapes inverted from those of the projections and the contact patch surface as well.

As shown in FIG. 2, formed in the center-area inner periphery 38 are a plurality of air vent holes 45 at predetermined intervals in the circumferential direction. As shown in FIG. 3, the air vent holes 45, which are through holes reaching the outer periphery 32, lead out the air trapped between the pattern molding surface 4a and the crown region C1 at the start of curing to the side of the base mold 20 located radially outside. In this example, the air vent holes 45 are disposed in the intermediate positions between the main groove molding projections 43, 43. Also, formed in the shoulder-area inner periphery 36a are a plurality of air vent holes 46 in the circumferential direction. As with the air vent holes 45, the air vent holes 46 are through holes reaching the outer periphery 32. In the present example, the air vent holes 46 are disposed in the intermediate positions between the lateral groove molding projections 44a disposed at equal intervals in the circumferential direction. Also, formed in the shoulder-area inner periphery 36b are a plurality of air vent holes 47 in the circumferential direction. As with the air vent holes 45 and 46, the air vent holes 47 are through holes reaching the outer periphery 32. In the present example, the air vent holes 47 are disposed in the intermediate positions between the lateral groove molding projections 44b disposed at equal intervals in the circumferential direction. As described above, the air vent holes 45, 46, and 47 are disposed as appropriate with consideration given to the positions and shapes of the main groove molding projections 43, 43 and lateral groove molding projections 44a and 44b provided on the pattern molding surface 4a. And they prevent the occurrence of molding defects, such as air bubbles, in the tire T left from curing by leading out the air trapped between the pattern molding surface 4a and the crown region C1 to the base mold 20 side. It is to be noted that in the present example, the air vent holes 45, 46, and 47 are represented as round holes, but their shape is not subject to any particular limitation. For example, the round holes may be replaced by slit-shaped holes for discharging air.

Next, a description is given of air discharge channels 48. As shown in FIG. 3, formed on the outer periphery 32 of the pattern mold 30 are a plurality of air discharge channels 48 which are depressed radially inward. The air discharge channels 48 are arranged at predetermined intervals in the axial direction in positions corresponding to the air vent holes 45, 46, and 47. The air discharge channels 48 extend continuously in the circumferential direction of the pattern mold 30, with the ends thereof reaching the circumferential end faces 39a and 39b of the pattern mold 30, respectively. As shown in FIG. 3, with the pattern mold 30 fitted to the base mold 20, the open tops of the air discharge channels 48 are closed by the inner periphery 22 of the base mold 20. Thus the air discharge channels 48 become channels with the respective circumferential ends open to the atmosphere.

Figure 5:
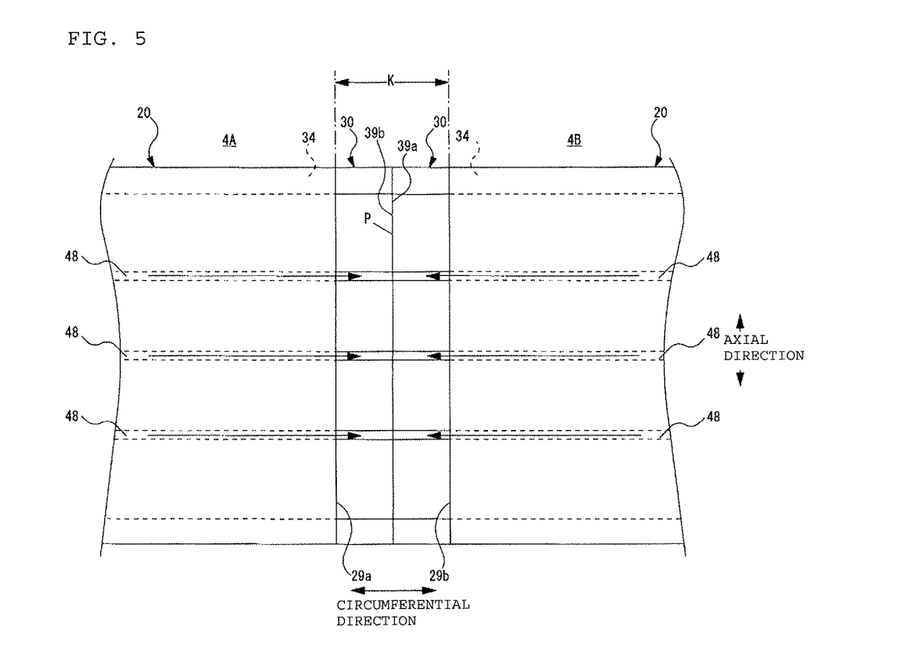
FIG. 5 is a side view for explaining air discharge channels.

FIG. 4 is a schematic plan view for explaining the positional relationship of sector molds 4 during a curing process. FIG. 5 is a perspective side view of circumferentially adjacent sector molds 4A and 4B as seen from the outer periphery 21 side of the base mold 20. In FIG. 4, a plurality of sector molds 4A to 4I are 9 units of sector molds arranged circumferentially with the rotation center R of the tire T at the center. The angle (division angle) of respective pattern molds 30 along the circumferential direction, which constitute the sector molds 4A to 4I, is set to 40°. And the circumferentially adjacent pattern molds 30 are joined closely together. To be more specific, for example, with the sector mold 4A and sector mold 4I which are circumferentially adjacent to each other, the circumferential end face 39b of the pattern mold 30 of the sector mold 4A is placed in close contact without a gap with the circumferential end face 39a of the pattern mold 30 of the adjacent sector mold 4I. Thus, the circumferential end faces 39a and 39b of the pattern molds 30 of the sector molds 4A to 4I are joined in close contact without a gap with the circumferential end faces 39b and 39a of the pattern molds 30 of the adjacent sector molds 4A to 4I. As a result, the surfaces of the crown region C1 and buttress regions B1 and B2 of the tire T are enclosed annularly by the pattern molding surfaces 4a of the pattern molds 30. It is to be noted that in the present example, one pattern mold 30 is configured by two division pieces 30A and 30B. Therefore, the division angle for each of the division pieces 30A and 30B is set to 20°, for instance.

On the other hand, the circumferential angle (division angle) of the base molds 20 constituting the sector molds 4A to 4I is set at 37°. The adjacent base molds 20 are spaced apart from each other with a gap of 6°. To be more specific, with the sector mold 4A and sector mold 4B which are circumferentially adjacent to each other, for instance, the circumferential end face 29b of the base mold 20 of the sector mold 4B is placed opposite to the circumferential end face 29a of the base mold 20 of the sector mold 4A with a gap of 6° in between. Thus, the circumferential end faces 29a and 29b of the base molds 20 of the sector molds 4A to 4I are placed opposite to the circumferential end faces 29b and 29a of the base molds of the adjacent sector molds 4A to 4I with a gap in between them. Accordingly, an air gap K, where there is no base mold 20, is formed in a position radially outside of the joint (division position) U, where the circumferential end faces 39a and 39b of the pattern molds 30 are joined with each other.

That is, when the sector molds 4A to 4I according to the present embodiment are arranged to enclose the crown region C1 of the tire T, the pattern molds 30 only, constituting the sector molds 4A to 4I, are in contact with each other while the base molds located radially outside of the pattern molds 30 are circumferentially spaced apart from each other by the air gap K.

And, as shown in FIG. 5, the circumferentially adjacent base molds 20 are spaced apart from each other. Thus, the air which has been led out through the afore-mentioned air discharge channels 48 to the circumferential end faces 39a and 39b sides of the pattern molds 30 is discharged to the atmosphere through the air gaps K. In this manner, according to this embodiment, the air gaps K are provided in the plurality of base molds 20 which are spaced apart from each other. As a result, the air can be discharged to the atmosphere irrespective of the positions of the air vent holes 45 to 47 which are provided with consideration given to the positions and shapes of the main groove molding projections 43, 43 and lateral groove molding projections 44a and 44b formed on the pattern molding surface 4a of the pattern mold 30. In other words, in the present embodiment, the structure for leading out the air trapped between the pattern molding surface 4a and the crown region C1 is provided collectively on the pattern mold 30. And the air led out by the structure is discharged to the atmosphere through the air gaps K between adjacent base molds 20. Accordingly, there is no need for providing a separate air discharge mechanism in the base mold 20 itself.

Therefore, on completion of curing a tire T using the pattern molds 30 having the pattern molding surface 4a as shown in FIG. 2, for instance, the pattern molds 30 can be removed from the base molds 20, and a tire T having a different tread pattern can be cured by replacing the pattern molds 30 with the pattern molds 30' having a pattern molding surface 4a with different positions and shapes of recesses and projections, such as the main groove molding projections 43, 43 and lateral groove molding projections 44a and 44b, or different positions of the air vent holes 45 to 47. In such a case, the base molds 20 can be reused, so that there is no need to prepare new base molds 20 conforming to the pattern molds 30'.

Also, in the present embodiment, the inner periphery 22 of the base mold 20 has a plurality of fastening portions formed thereon at predetermined intervals circumferentially. Hence, it is possible to detachably fit an increased number of division pieces to the same base mold 20 even when the number of division pieces constituting the pattern mold 30 to be fitted to the base mold 20 is increased. It is to be noted that the case where the number of division pieces has to be increased may include a case where the division angle per division piece must be made smaller with increased division positions. Such may be necessitated on account of the positions and shapes of recesses and projections, i.e., the main groove molding projections 43, 43 and lateral groove molding projections 44*a* and 44*b*, on the pattern molding surface 4*a* of the pattern mold 30, or the positions of the air vent holes 45 to 47 which must be changed accordingly. Also, the division angle per division piece may have to be made smaller when the entire shape of the pattern mold 30 cannot be formed at once by an additive manufacturing process because of the large tire diameter of the tire T to be cured.

Also, with the base mold 20 according to the present embodiment, the division pieces can be properly fitted to the base mold 20 without preparing the base mold 20 even in a case where the number of division pieces constituting the pattern mold 30 varies with each pattern mold 30 for the reasons given above.

Furthermore, the arrangement with the sector mold 4 according to the present embodiment is such that the plurality of pattern molds 30 only are joined with each other circumferentially during a curing process. Thus it is possible to cure tires T of different diameters using the same curing apparatus 1. More specifically, the tires T of different diameters can be cured while keeping the same structure of segments 9 and base molds 20 by increasing or decreasing the circumferential length L3 of the pattern molding surfaces 4*a* or the thickness (radial dimension) of the pattern molds 30 constituting the sector molds 4A to 4I as shown in FIG. 4.

In the above-described embodiment, the arrangement may also be such that no air vent holes 45 to 47 are provided in the pattern mold 30. And when no air vent holes 45 to 47 are provided therein, the air trapped between the pattern molding surface 4*a* and the crown region C1 is led out to the base mold 20 side through the minute slits present between the circumferential end faces 37*a* and 37*b* of the division pieces 30A and 30B constituting the pattern mold 30 and the slits present at the circumferential end faces 39*a* and 39*b* of the pattern molds 30 of the adjacent sector molds 4. And the air thus led out is discharged to the atmosphere through the air discharge channels 48 and air gaps K. Also, the arrangement may be such that the air discharge channels 48 are designed to extend in the axial direction.

Figure 6:
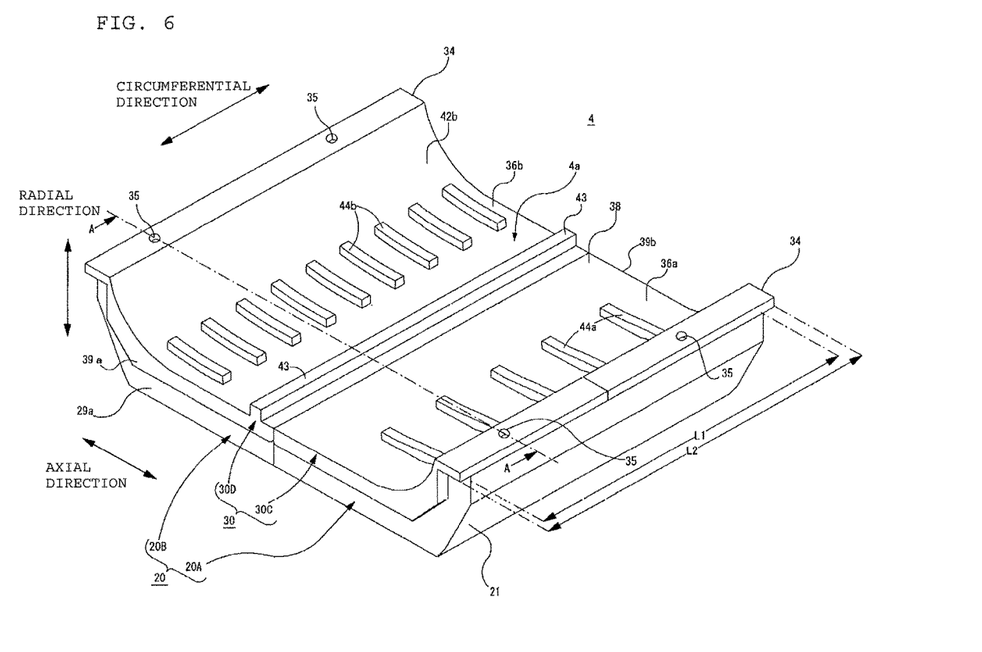
FIG. 6 is an overall perspective view of a sector mold (of another embodiment).
Figure 7:
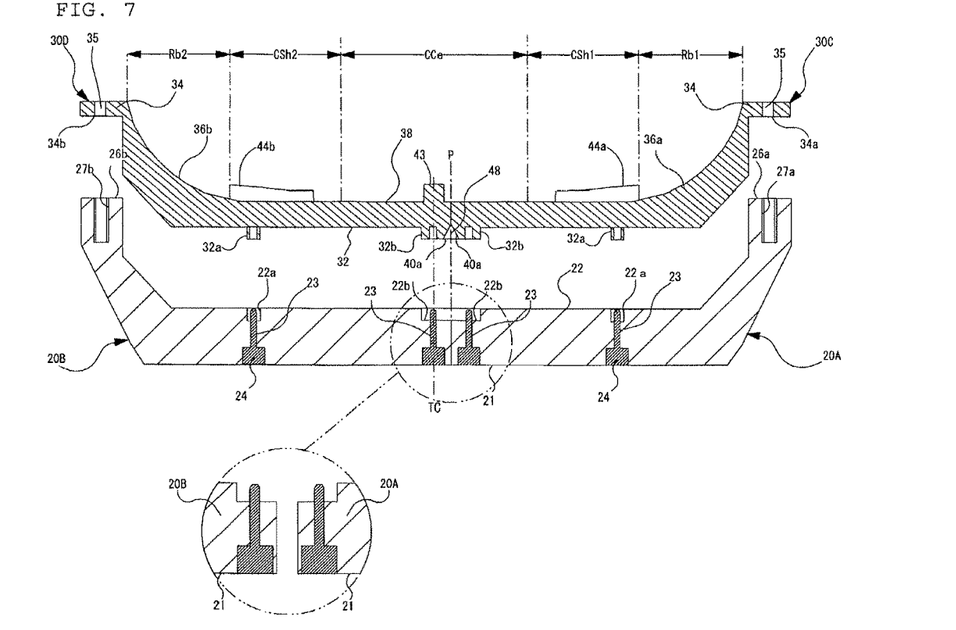
FIG. 7 illustrates an axial cross section A-A section of FIG. 6) of a sector mold.

Next, with reference to FIG. 6 and FIG. 7, a description is given of the structure of a sector mold 4 according to another embodiment. Note that in the following description, the identical components are given the identical reference numerals and the repeated description thereof will be omitted. In the above-described embodiment, a description has been given of an example in which the pattern molds 30 each constituted by circumferentially divided division pieces 30A and 30B are fitted to the base molds 20. The present embodiment differs therefrom in that the base molds 20 and the pattern molds 30 are both divided in the axial direction and no air vent holes 45 to 47 are provided therein.

It is to be noted here that the case where the base mold 20 and the pattern mold 30 are each structured by a plurality of division pieces is, for example, a case where it is difficult to manufacture the base mold 20 and the pattern mold 30 in single units by a manufacturing apparatus because of the large axial dimensions of the tire T to be cured.

As shown in FIG. 7, the division point P of the base mold division pieces 20A and 20B constituting the base mold 20 and the division point P of the pattern mold division pieces 30C and 30D constituting the pattern mold 30 are set at a position slightly off from the tire center TC to avoid the position of the main groove molding projection 43 so as to prevent faulty molding of the main groove to be molded by the main groove molding projection 43. Formed in the inner peripheries 22 of the base mold division pieces 20A and 20B are positioning recesses 22*b*, 22*b* depressed radially outwardly, respectively. The positioning recesses 22*b*, 22*b* extend between the circumferential end faces 29*a*, 29*b*. With the pattern mold division pieces 30C and 30D combined with each other axially, the positioning projections 32*b*, 32*b* having a rectangular cross section and projecting radially outwardly are fitted into the positioning recesses 22*b*, 22*b*.

The positioning recesses 22*b*, 22*b* are communicated with the outer periphery 21 via the bolt holes 23 extending from the bottom of the positioning recesses 22*b*, 22*b* to the outer periphery 21, respectively. The bolt holes 23 allow the insertion of bolts 24 as the fastening means from the outer periphery 21 toward the inner periphery 22. The thread part formed at the end of the bolt 24 is screwed into the thread part (internal thread) of the positioning projections 32*b*, 32*b* provided on the outer periphery 32 of the pattern mold 30.

With the pattern mold division pieces 30C and 30D combined with each other, the positioning projections 32*b*, 32*b* formed on the pattern mold division pieces 30C and 30D, respectively, are rectangular in cross section to mate with the positioning recesses 22*b*, 22*b*. And formed in the radially outward ends of the positioning projections 32*b*, 32*b* are thread part to engage with the end portions of the bolts 24. Also, formed on the division point P side of the positioning projections 32*b*, 32*b* are notches 40*a*, 40*a*, which together have a triangular cross section. With the pattern mold division pieces 30C and 30D combined with each other, the notches 40*a*, 40*a* constitute an air discharge channel 48 with the respective ends thereof reaching the circumferential end faces 39*a* and 39*b* of the pattern mold 30, respectively.

In one example of combination of the base mold 20 and the pattern mold 30, the pattern mold division pieces 30C and 30D are fitted to the base mold division pieces 20A and 20B constituting the base mold 20, respectively. More specifically, the positioning projections 32*b*, 32*b* formed on the pattern mold division pieces 30C and 30D are fitted into the positioning recesses 22*b*, 22*b* formed in the base mold division pieces 20A and 20B, and the bolts 24 are inserted through the bolt holes 23 from the outer periphery 21 side of the base mold 20 and screwed into the positioning projections 32*b*, 32*b* to fasten the base mold 20 and the pattern mold 30 together. Further, not-shown bolts are screwed in and tightened through a plurality of bolt holes 27*a* and 27*b* from the side of the plurality of bolt holes 35 provided in the pattern mold division pieces 30C and 30D. As a result, the pattern mold division piece 30C is united with the base mold division piece 20A, and the pattern mold division piece 30D with the base mold division piece 20B. Next, the base mold division pieces 20A and 20B respectively united with the pattern mold division pieces 30C and 30D are secured to the inner periphery 9*b* of the segment 9 by a not-shown fixing means. With the base mold division pieces 20A and 20B fixed to the segment 9, the axially inner end faces of the base mold division pieces 20A and 20B are brought into close contact with each other at the division point P. Also, the axially inner end faces of the pattern mold division pieces 30C and 30D are brought into tight contact with each other at the division point P. It is to be noted that the arrangement may be such that the axially inner end faces of the base mold division pieces 20A and 20B are spaced apart from each other with the division point P in between as shown by the imaginary line in FIG. 7.

In this structure as described above, the base mold 20 and the pattern mold 30 are comprised of the axially divided base mold division pieces 20A and 20B and pattern mold division pieces 30C and 30D, respectively. Therefore, the sector molds 4 can be manufactured without being dimensionally restricted even when the axial dimensions of the tire T to be cured are large.

Also, with the foregoing embodiment, the positioning recesses 22a, 22a, the positioning recesses 22b, 22b, and the bolt holes 23 in their corresponding positions are provided on the inner periphery 22 of the base mold 20 as the fastening portions. However, an increased number of fastening portions may be formed at predetermined intervals in the axial direction. Then it is possible to detachably fit the increased number of division pieces to the same base mold 20 even when the number of division pieces to be fitted to the base mold 20 is increased as a result of reduction in the angle (division angle) in the axial direction of one division piece.

Also, in the present embodiment, the arrangement is such that the air trapped between the pattern molding surface 4a and the crown region C1 is led out through the minute slits present between the axially inner end faces of the pattern mold division pieces 30C and 30D joined with each other at the division point P, without the provision of the air vent holes 45, 46, 47. And the air thus led out to the base mold 20 side through the slits is led out to the circumferential end faces 39a, 39b side of the pattern mold 30 through the air discharge channel 48 formed by the notches 40a, 40a in the positioning projections 32b, 32b and discharged outside through the air gaps K formed by the plurality of circumferentially adjacent base molds 20.

Also, in the foregoing embodiments, descriptions have been given of an example in which the pattern mold 30 is constituted by circumferentially divided division pieces 30A and 30B, an example in which the pattern mold 30 is constituted by axially divided division pieces 30C and 30D, and an example in which the base mold 20 is constituted by axially divided base mold division pieces 20A and 20B. However, the direction of division and the arrangement of the base mold 20 and the pattern mold 30 are not limited to the above-mentioned combinations. The direction of division and the arrangement can be freely employed for each of the base mold 20 and the pattern mold 30.

Figure 8:
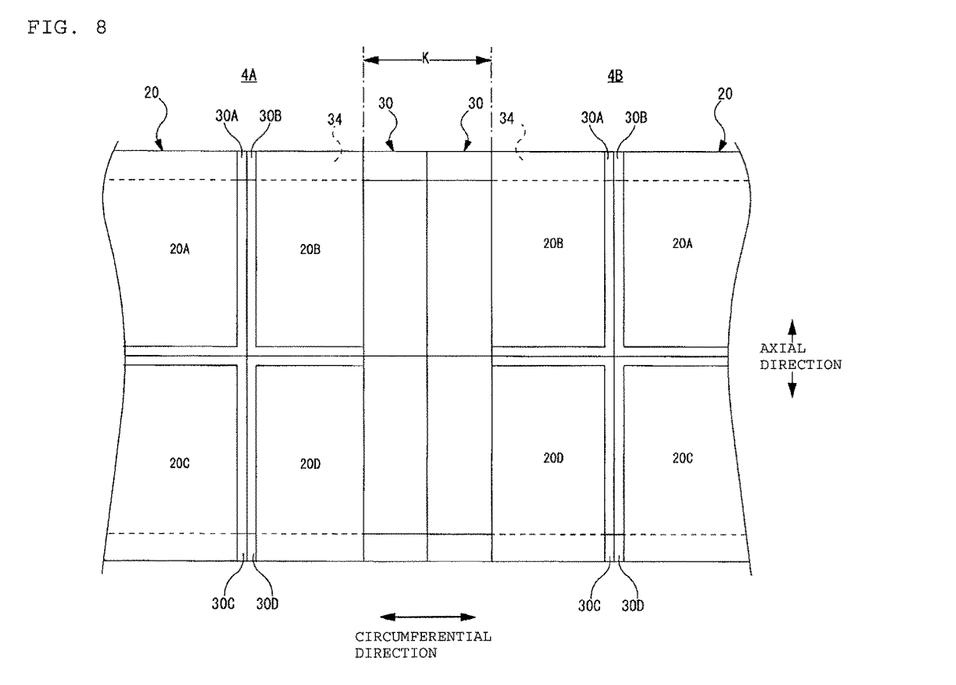
FIG. 8 is a side view of base mold and pattern mold (of another embodiment).

FIG. 8 is a side view showing an example in which the base mold 20 and the pattern mold 30 are both divided in the axial and circumferential directions. As shown in the illustration, the base mold 20 according to this embodiment is constituted by a plurality of base mold division pieces 20A to 20D divided both axially and circumferentially. Also, the pattern mold 30 is similarly constituted by a plurality of pattern mold division pieces 30A to 30D divided both axially and circumferentially. In this implementation, for instance, the circumferentially adjacent base mold division pieces 20A and 20B and base mold division pieces 20C and 20D are spaced apart by a predetermined distance from each other, respectively. Also, the axially adjacent base mold division pieces 20A and 20B and base mold division pieces 20B and 20D are spaced apart by a predetermined distance from each other, respectively.

On the other hand, the circumferential end faces of the circumferentially adjacent pattern mold division pieces 30A and 30B and pattern mold division pieces 30C and 30D are in close contact with each other. As shown in the illustration, the positions where the circumferential end faces of the circumferentially adjacent pattern mold division pieces 30A and 303 and the circumferential end faces of the pattern mold division pieces 30C and 30D are joined with each other are set between the base mold division pieces 20A and 20B and between the base mold division pieces 20C and 20D, respectively.

Also, the axial end faces of the axially adjacent pattern mold division pieces 30A and 30C and pattern mold division pieces 30B and 30D are in close contact with each other. And the positions where the circumferential end faces of the pattern mold division pieces 30A and 30C and the axial end faces of the pattern mold division pieces 30B and 30D are joined with each other are set between the base mold division pieces 20A and 20C and between the base mold division pieces 20B and 20D, respectively.

In this manner, if the base mold 20 is divided in both directions and the end faces of the division pieces are spaced apart from each other, then it is possible to discharge air through the gaps between the base mold division pieces 20A and 20C and between the base mold division pieces 20A to 20D without providing the air discharge channel 48 formed by the above-mentioned notches 40a, 40a. And, in this kind of structure, too, a plurality of fastening portions as described in the foregoing embodiments may be formed at predetermined intervals circumferentially and axially on the inner periphery 22 of the base mold 20, and additional fastening portions that can be left unused depending on the circumferential and axial division angles of the division pieces may be provided. Then it is possible to detachably fit the increased number of division pieces to the same base mold 20 even when the number of division pieces to be fitted to the base mold 20 is increased as a result of reduction in the division angle of each division piece.

Also, in the foregoing embodiments, the arrangement of fastening portions on the base mold 20 is commonized and standardized. Hence, in manufacturing the pattern mold 30 by an additive manufacturing process, it only suffices that the positions and shapes of the positioning projections 32a to be provided on the outer periphery 32 are set according to the commonized arrangement of the fastening portions. Therefore, if the division angle of the division pieces constituting the pattern mold 30 is the same, the profile of the outer periphery 32 can be formed using the same 3D data. On the other hand, even when the division angle of the division pieces is different, the positions and shapes of the positioning projections 32a to be provided on the outer periphery 32 can be determined according to the commonized arrangement of the fastening portions. Therefore, the efficiency of generating 3D data can be improved.

The invention has been described with reference to a plurality of embodiments thereof. However, the technical scope of the invention is not limited to the described scope of the embodiments. And it should be evident to those skilled in the art that various combinations thereof may be made without departing from the spirit and scope of the invention.

DESCRIPTION OF REFERENCE NUMERALS 1 curing apparatus
2 side mold
3 side mold
4 sector mold
4a pattern molding surface
20 base mold
22 inner periphery 22a positioning recess
23 bolt hole
27a, 27b bolt hole
29a, 29b circumferential end face
30 pattern mold
30A, 30B, 30C, 30D division piece
32 outer periphery
39a, 39b circumferential end face
45, 46, 47 air vent hole
48 air discharge channel
K air gap

The invention claimed is:

1. A tire mold comprising:
a base mold; and
a pattern mold detachably fitted to the base mold,
wherein the pattern mold has a pattern molding surface opposite to a crown region of a tire and forms a tread pattern on the crown region, and
wherein the base mold has an inner fitting periphery to be fitted to an outer fitting periphery of the pattern mold on the opposite side of the pattern molding surface thereof, with a peripheral length of the inner fitting periphery being set shorter than a peripheral length of the outer fitting periphery,
wherein the pattern mold comprises a plurality of division pieces which are divided in the circumferential and axial directions or in any one of the circumferential and axial directions of the pattern mold,
wherein the division pieces are fitted to the base mold via a plurality of fastening portions formed on the inner fitting periphery of the base mold, and
wherein the plurality of fastening portions include fastening portions that are not used in a state where the division pieces are fitted to the base mold.

2. A tire curing apparatus comprising:
a plurality of tire molds arranged along a crown region of a tire, the tire mold including a base mold, and a pattern mold detachably fitted to the base mold and having a pattern molding surface opposite to the crown region of the tire to form a tread pattern on the crown region,
wherein the base mold has an inner fitting periphery to be fitted to an outer fitting periphery of the pattern mold on an opposite side of the pattern molding surface thereof, with a peripheral length of the inner fitting periphery being set shorter than a peripheral length of the outer fitting periphery,
wherein circumferentially adjacent end faces of the pattern molds of circumferentially adjacent tire molds of the plurality of tire molds come in contact with each other and circumferentially adjacent end faces of the base molds are spaced apart from each other,
wherein the pattern mold comprises a plurality of division pieces which are divided in circumferential and axial directions or in any one of the circumferential and axial directions of the pattern mold,
wherein the division pieces are fitted to the base mold via a plurality of fastening portions formed on the inner fitting periphery of the base mold, and
wherein the plurality of fastening portions include fastening portions which are not used in a state where the division pieces are fitted to the base mold.

3. The tire curing apparatus according to claim 2, wherein contact points of the circumferentially adjacent end faces of the pattern molds of the circumferentially adjacent tire molds falls between the spaced-apart base molds.

4. The tire curing apparatus according to claim 2, wherein the base mold comprises a plurality of division pieces which are divided in circumferential and axial directions or in any one of the circumferential and axial directions, and wherein the division pieces of the base mold are spaced apart from each other.

5. The tire curing apparatus according to claim 4, wherein contact points of the plurality of division pieces constituting the pattern mold falls between the plurality of division pieces constituting the base mold.

6. The tire curing apparatus according to claim 2, wherein the pattern mold has air discharge channels formed in the outer fitting periphery and extending toward circumferential or axial end faces.

* * * * *